United States Patent [19]
Gelber

[11] Patent Number: 5,410,746
[45] Date of Patent: Apr. 25, 1995

[54] COMBINED HEADGEAR AND ELECTRONIC RECEIVING DEVICE

[75] Inventor: Hugh T. Gelber, New City, N.Y.

[73] Assignee: Unatech Corp., New City, N.Y.

[21] Appl. No.: 668,857

[22] Filed: Mar. 13, 1991

[51] Int. Cl.⁶ ............................................. H04B 1/08
[52] U.S. Cl. .................... 455/344; 455/350; 455/351
[58] Field of Search ............... 455/344, 351, 90, 88, 455/89, 347; 2/185 R, 142, 199; 381/88

[56] References Cited

U.S. PATENT DOCUMENTS

| | | | |
|---|---|---|---|
| 3,845,389 | 10/1974 | Phillips et al. | 455/351 |
| 3,906,160 | 9/1975 | Nakamura et al. | 455/351 |
| 4,077,007 | 2/1978 | McKinney | 455/351 |
| 4,130,803 | 12/1978 | Thompson | 455/351 |
| 4,312,076 | 1/1982 | Gamm | 2/199 |
| 4,321,433 | 3/1982 | King | 455/351 |
| 4,451,935 | 6/1984 | Henschel | 2/199 |
| 4,524,461 | 6/1985 | Kostanty et al. | 455/88 |
| 4,727,599 | 2/1988 | Rappaport et al. | 455/351 |
| 4,776,044 | 10/1988 | Makins . | |
| 4,827,384 | 5/1989 | Von Schlemmer | 2/199 |
| 4,833,726 | 5/1989 | Shinoda et al. | 455/351 |
| 4,856,086 | 8/1989 | McCullough | 455/351 |
| 4,858,248 | 8/1989 | Goldsmith et al. . | |
| 4,869,509 | 9/1989 | Lee . | |
| 4,882,769 | 11/1989 | Gallimore | 455/344 |
| 5,034,995 | 7/1991 | Ciccone | 455/351 |
| 5,052,054 | 10/1991 | Birum | 2/185 R |

FOREIGN PATENT DOCUMENTS

| | | | |
|---|---|---|---|
| 1384768 | 11/1964 | France | 455/351 |
| 0288525 | 12/1986 | Japan | 455/90 |
| 1593061 | 7/1981 | United Kingdom | 2/142 |

OTHER PUBLICATIONS

Schwartz Radio Hat, Potomac Magazine, Washington Post, Dec. 10, 1972, p. 71.

Primary Examiner—Edward F. Urban
Attorney, Agent, or Firm—Ostrolenk, Faber, Gerb & Soffen

[57] ABSTRACT

Headgear, such as a cap having a crown, a brim and an internal sweatband or flap, is combined with an electronic receiving device, such as a radio, which is connected to the inner surface of the flap by a first double sided adhesive strip. The first strip, in turn, is adhesively secured to a backing element mechanically attached to the flap. A battery holder is similarly mounted to the flap on the other side of the brim by a second double sided adhesive strip and a second backing element. Earphones are connected to the radio by suitable wires with the wires for the earphones on the opposite side of the radio, along with wires connecting the battery holder to the radio, being secured to the inner surface of the flap adjacent the brim by a third double sided adhesive strip. Preferably, when an electronic receiving means is an AM/FM radio, an antenna is provided.

3 Claims, 2 Drawing Sheets

COMBINED HEADGEAR AND ELECTRONIC RECEIVING DEVICE

BACKGROUND OF THE INVENTION

The present invention relates to a combined headgear and an electronic receiving device and to a cap to use in such a combination. More particularly, the invention relates to a combined cap and radio.

The combination of a cap and an electronic receiving device, such as a radio, is known. One such combination includes an external pocket on one side of the crown of the cap for receiving a radio receiver, and an external pocket on the other side of the crown for receiving a battery holder. The cap also includes a pair of earphones. The earphone on the same side of the cap as the radio receiver is directly connected to the radio receiver. Wires connecting the other earphone to the radio receiver, as well as wires connecting the battery holder to the radio receiver, are connected to the radio receiver through a fabric tunnel sewn to the underside of the brim.

While functionally such an arrangement works well, its manufacture is quite costly. In particular, the requirement for external pockets either requires that such pockets be formed integrally during the manufacturing process for the hat, thereby precluding the use of standard caps and the economies of scale one would achieve by using such caps, or, if standard caps are employed, requires a separate manufacturing operation to attach the pockets to the crown. In this latter situation, economies of scale are again lost because it is necessary to match the external pockets to the color and fabric of the remainder of the cap. In addition, sewing is inherently a more cost-intensive operation than other methods of attachment. Accordingly, an additional cost-intensive operation in the manufacture of such a combined cap and radio is the sewing of the fabric tunnel to the inside of the brim.

SUMMARY OF THE INVENTION

Accordingly, it is an object of the present invention to provide combined headgear and electronic receiving unit which overcomes the foregoing disadvantages.

More specifically, it is an object of this invention to provide a combined cap and radio, and a cap for use in such a combination, which eliminates external pockets, eliminates all sewing operations, and uses a standard cap, thereby enabling substantial savings in manufacture.

The foregoing and other objects of the invention are achieved in accordance with certain principles of the invention by headgear having a crown with an inner surface facing the head of the user, and a peripheral internal flap secured to the crown. The flap has an inner surface which faces the internal surface of the crown and an opposed outer surface. First double-sided adhesive means are secured to the inner surface of the flap on a first side of the crown. Second double-sided adhesive means are secured to the inner surface of the flap on a second side of the crown opposite to the first side. Third double-sided adhesive means are secured to the inner surface of the flap between the first and second sides thereof.

In accordance with one aspect of the invention, the foregoing headgear is combined with a electronic receiving device. In particular, an electronic receiving device, such as a radio receiver, is adhesively secured to the first double-sided adhesive securing means, and battery receiving means are secured to the second double-sided adhesive means. Additionally, a pair of earphones is provided. The set of wires for one earphone is directly connected to the radio receiver and the set of wires for the other earphone, along with wires connecting the battery receiving means to the radio receiver, are adhesively secured to the third double-sided adhesive securing means.

Preferably, the first and second double-sided adhesive means each include a support element and a strip of double-sided adhesive tape. Additionally, when the electronic means comprises an AM/FM radio, the combined headgear and radio is provided with a suitable antenna.

In accordance with another aspect of the invention, the headgear is a cap having a brim which includes openings for receiving the earphones when they are not in use.

The term "double-side adhesive means", as used herein, means any attachment technique wherein parts are attached to each other by adhesive contacting each part, or by an equivalent mechanical "adhesive" system. Examples of attachment techniques deemed to fall within this definition are double-side adhesive strips, hot glue attachment and hook and loop fastening systems such as those marketed under the trademark "Velcro".

BRIEF DESCRIPTION OF THE DRAWINGS

Other objects, features and advantages of the present invention will become apparent from the following description of the invention which refers to the accompanying drawings, in which.

DESCRIPTION OF THE PREFERRED EMBODIMENT

Figure 1:
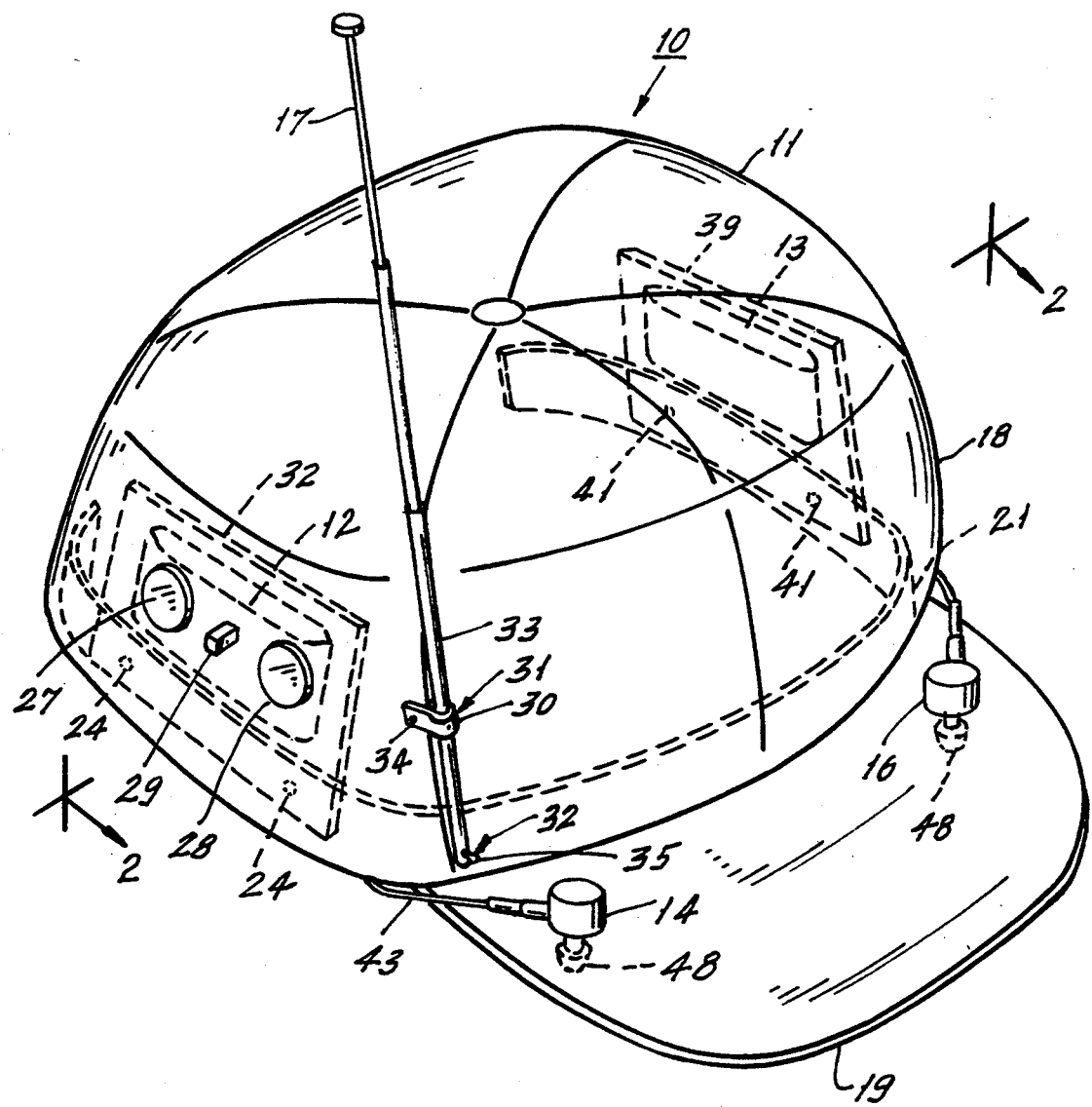
FIG. 1 is a perspective view of the combined cap and electronic receiving device illustrating certain principles of the invention.

Referring to the drawings, and in particular to FIG. 1, there is shown a combined cap and electronic device designated generally by the reference numeral 10. The combined unit 10 includes a cap 11 and an electronic receiving device, such as a radio receiver 12, a battery holder 13 and earphones 14 and 16. Preferably, when the radio 12 is of the AM/FM type, an antenna 17 is provided.

The cap 11 may be of any conventional design and manufacture, and includes a crown 18, a brim 19, and an internal peripheral sweatband or flap 21. As is conventional, only one edge of the flap is attached to the brim 19 and the crown 18, enabling the flap to be moved between a position in which it is flush with the inner surface of the crown and a position in which it may be pulled away to enable access to the inner surface of the flap (i.e., the surface facing the crown), as well as to enable access to the inner junction between the crown 18 and the brim 19.

Figure 3:
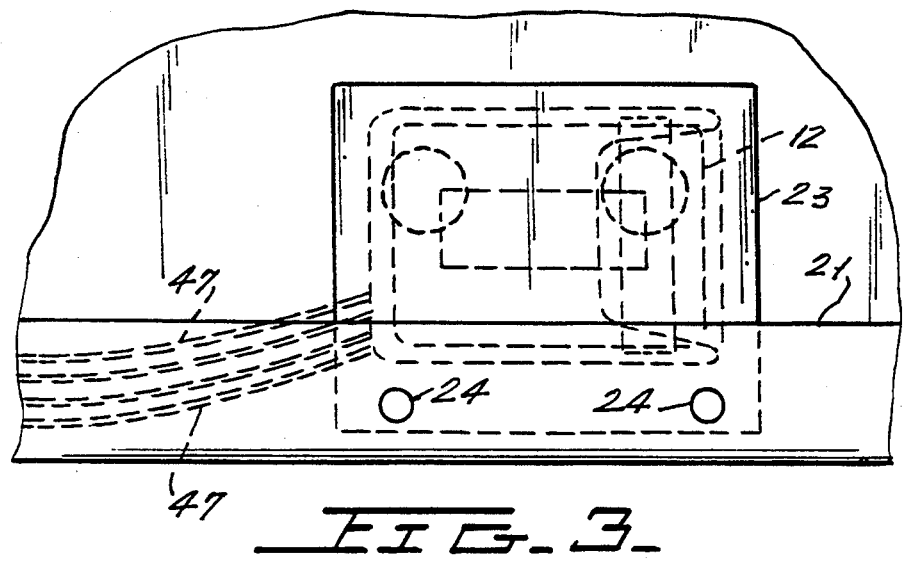
FIG. 3 is a fragmentary view with portions removed for the sake of clarity taken along the lines 3—3 of FIG. 1.
Figure 2:
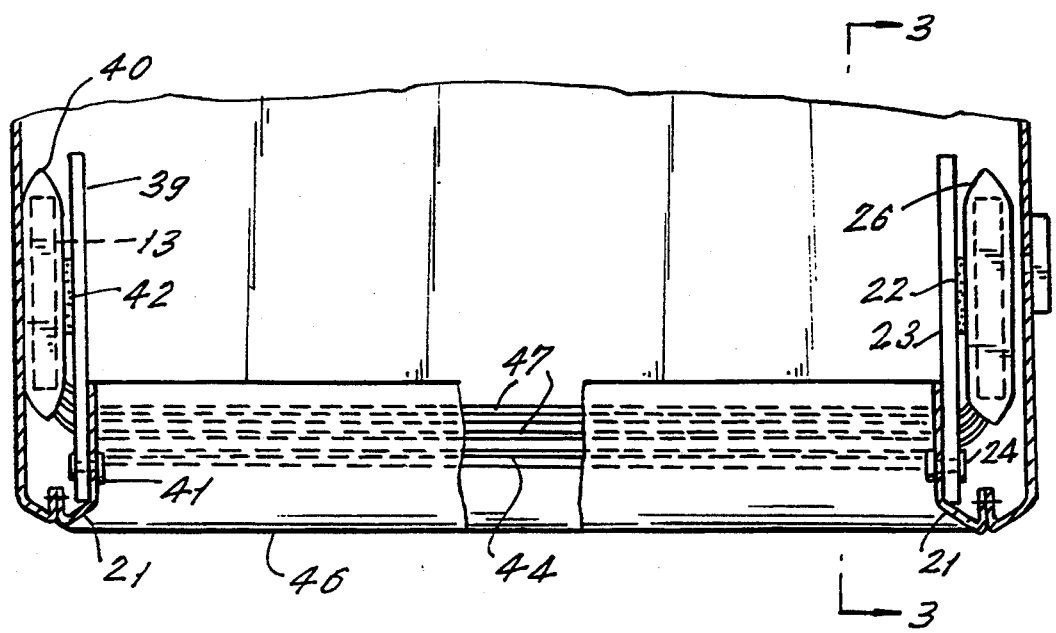
FIG. 2 is a fragmentary view with portions removed for the sake of clarity taken along the lines 2—2 of FIG. 1.

As best seen in FIGS. 2 and 3, the radio 12 is secured to the inner surface of the flap 21 by engagement with one side of a double-sided adhesive strip 22, while the other side of the strip 22 may be directly attached to the inner surface of the flap 21. Preferably, however, the strip 22 is attached to a backing or support element 23. The support 23 is formed of a plastic mesh which has sufficient flexibility so as to conform to the shape of the crown 18 when a user is wearing the cap 11, and is secured to the flap 21 by means of suitable mechanical fasteners, such as the grommets 24—24. In addition to the strip 22, additional double-sided strips (not shown) may be employed to more positively secure the radio 12 to the cap 11. For example, one additional strip may be employed between the radio 12 and the inner surface of the crown 18 to secure the radio to the crown and another strip may be employed between the radio and the strip 22, thus essentially providing double the adhesive force to secure the radio to the support element 23.

The radio 12 is a standard AM/FM radio such as Model RC5, available from Jung-Kong Electronics, South Korea, and may be enclosed in a suitable carrying case 26. The radio 12 includes a station selector dial 27, an on/off/volume dial 28, and an AM/FM selector switch 29. Each of these controls is inserted through respective openings formed in a side panel of the crown 18, so as to be accessible to the user.

Referring back to FIG. 1, the antenna 17, which is preferably of the telescoping type, is mounted to the crown 18 by means of suitable top and bottom fasteners 31 and 32, respectively. The top fastener 31 includes a tubular bracket 30 through which the outer-barrel 33 of antenna 17 slidably passes, the bracket being attached to the cap by means of a rivet 34. The bottom fastener 32 includes a cotter pin 35 which slidably passes through an opening in the barrel 33 and which is suitably secured at the end within the crown 18 by a suitable fastener (not shown). A wire (not shown) electrically connects the antenna 17 to the radio 12.

The top fastener 31 enables vertical sliding movement of the antenna barrel 33 through the tubular bracket 30, while the bottom fastener 32 enables horizontal sliding movement of the antenna barrel along the cotter pin 35. This double degree of freedom of movement of the antenna barrel 33 relieves forces acting on the antenna barrel when the cap 11 is seated upon the head of the user, thereby preventing any damage, such as tearing, that might occur to the cap as a result of such forces.

The battery holder 13 is secured to the inner surface of the flap 21 on the other side of the brim 19 in a manner similar to that by which the radio 12 is secured. In particular, the securing means includes a plastic mesh backing or support element 39 secured to the flap by suitable fasteners, such as the grommets 41—41. A double-sided adhesive strip 42 has one surface attached to the support member 39 with the battery holder 13 being attached to the other surface of the double-sided adhesive strip. Preferably, as was the case for the radio, the battery holder is enclosed in a suitable carrying case 40.

As best seen in FIGS. 1 and 2, the earphone 14, which is on the same side as the radio 12, is directly connected to the radio 12 by a wire 43. The earphone 16, on the same side as the battery holder 13, is connected to the radio 12 by means of a wire 44. Since the earphone 16 is on the opposite side of the brim 19 from the radio 12, rather than running the wire 44 directly to the radio 12, the wire 44 is physically attached to one side of a double-sided adhesive strip 46 which, in turn, is attached to the inner surface of the flap 21. The strip 46 extends from one side of the brim 19 to the other side. The wires 47—47 from the battery case 13 to the radio 12 are also attached to the strip 46. The earphones 14 and 16 may be inserted through a pair of holes 48—48 in the brim 19 when the radio is not in use.

The tape employed for the strips 22 and 42 may be 1⅛ inches wide by 3½ inches long; the strip 46 may be 1 inch wide by 3½ inches long; and the additional strips (not shown) associated with more positively securing the radio may be 1 inch by 1⅞ inches long. The foregoing are available from Tape Systems, Mount Vernon, N.Y. as double side rubber base tape.

Although the present invention has been described in relation to particular embodiments thereof, many other variations and modifications and other uses will become apparent to those skilled in the art. Thus, although the invention has been described in connection with a radio 12, other electronic receiving means, such as cassette players, may be suitably employed instead. Additionally, while the invention has been illustrated in connection with a cap as should be appreciated other types of headwear may be combined with electronic receiving means utilizing double sided adhesive means to secure the necessary component parts. It is preferred, therefore, that the present invention be limited not by the specific disclosure herein, but only by the appended claims.

What is claimed is:

1. A combination cap and radio, which comprises:

a cap having a vertically extending crown with an inner surface facing the head of a user, the crown having a first side facing one side of the head of the user and having a second side facing the opposite side of the head of the user, a horizontally extending brim attached to the crown between the first and second sides and a flat, horizontally positioned internal peripheral sweatband movably secured to the crown, the sweatband having an inner surface facing the internal surface of the crown and an opposed outer surface, and being movable between an upper position in which the inner surface thereof faces the internal surface of the crown and a lower position in which the inner surface thereof faces away from the internal surface of the crown;

first double sided adhesive means including a first flat, thin support element fixedly secured to the inner surface of the sweatband at a region of the flap located adjacent the first side of the crown and a first strip of double sided adhesive tape having one side adhesively secured to the first support element;

an AM/FM radio adhesively secured to the other side of the first double sided adhesive strip;

second double sided adhesive means including a second flat, thin support element fixedly secured to the inner surface of the sweatband at a second region of the sweatband located adjacent the second side of the crown and a second strip of double sided adhesive tape having one side adhesively secured to the first support element;

battery receiving means adhesively secured to the other side of the second double sided adhesive strip and having first wire means connecting the battery receiving means to the radio;

first and second earphones connected to the radio by respective second and third wire means; and a third strip of double sided adhesive tape having one side adhesively secured to the inner surface of the sweatband at a third region located adjacent to the brim and between the first and second sides of the crown, the first and second wire means being adhesively secured to the other side of the third double sided adhesive strip.

2. The combination cap and radio defined in claim 1, wherein the first and second support elements each comprise a plastic mesh, the brim includes first and second spaced openings for respectively receiving the first and second earphones, the first opening being located on the brim closer to the battery receiving means than to the radio and the second opening being located on the brim closer to the radio than to the battery receiving means; and further comprising an antenna physically mounted to the crown and electrically connected to the radio.

3. The combination cap and radio defined in claim 2, wherein the radio has a station selector dial, an on/off/volume dial and an AM/FM selector switch, the first side of the crown has three openings and the selector dial, on/off/volume dial and AM/FM selector switch protrude through respective ones of the openings when the sweatband is in its upper position.

* * * * *